United States Patent
Haut et al.

(10) Patent No.: US 12,397,843 B2
(45) Date of Patent: *Aug. 26, 2025

(54) STROLLER AND BASKET THEREOF

(71) Applicant: Wonderland Switzerland AG, Steinhausen (CH)

(72) Inventors: Robert E. Haut, Merion Station, PA (US); Colin F. Eggert-Crowe, Philadelphia, PA (US)

(73) Assignee: Wonderland Switzerland AG, Steinhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,834

(22) Filed: Jul. 12, 2023

(65) Prior Publication Data
US 2023/0347962 A1  Nov. 2, 2023

Related U.S. Application Data

(63) Continuation of application No. 17/156,659, filed on Jan. 25, 2021, now Pat. No. 11,738,792, which is a continuation of application No. 16/563,955, filed on Sep. 9, 2019, now Pat. No. 10,940,880.

(60) Provisional application No. 62/729,115, filed on Sep. 10, 2018.

(51) Int. Cl.
*B62B 9/26* (2006.01)
*B62B 7/06* (2006.01)
*B62B 9/20* (2006.01)

(52) U.S. Cl.
CPC ............... *B62B 9/26* (2013.01); *B62B 7/06* (2013.01); *B62B 9/20* (2013.01)

(58) Field of Classification Search
CPC .................................. B62B 9/26; B62B 7/06
See application file for complete search history.

(56) References Cited

U.S. PATENT DOCUMENTS

| | | | |
|---|---|---|---|
| 7,458,599 B2 | 12/2008 | Kassai | |
| 7,500,692 B2 | 3/2009 | Espenshade | |
| 9,090,277 B1 | 7/2015 | Chen | |
| 9,402,774 B1 | 8/2016 | Martin | |
| 10,940,880 B2 * | 3/2021 | Haut | B62B 9/20 |
| 11,738,792 B2 * | 8/2023 | Haut | B62B 9/20 280/47.38 |
| 2004/0070178 A1 | 4/2004 | Yoshie | |

(Continued)

FOREIGN PATENT DOCUMENTS

| CN | 2808687 Y | 8/2006 |
|---|---|---|
| CN | 101691123 A | 4/2010 |

(Continued)

*Primary Examiner* — Brian L Swenson
(74) *Attorney, Agent, or Firm* — Winston Hsu

(57) ABSTRACT

A stroller includes a frame and a basket disposed on the frame. The basket includes a tube mount, a first tube member, a second tube member and a basket covering. The tube mount is disposed on the frame. The first tube member is connected to the tube mount. The second tube member is connected to the tube mount and rotatably switchable relative to the frame between a folded position and an unfolded position. The basket covering is disposed on the first tube member and the second tube member. A storage space is enclosed by the basket covering. A volume of the storage space is adjustable by rotation of the second tube member relative to the frame.

18 Claims, 10 Drawing Sheets

(56) References Cited

U.S. PATENT DOCUMENTS

| | | |
|---|---|---|
| 2004/0222608 A1 | 11/2004 | Espenshade |
| 2005/0161912 A1 | 7/2005 | Cheng |
| 2005/0225056 A1 | 10/2005 | Dotsey |
| 2006/0214397 A1 | 9/2006 | Dotsey |
| 2007/0216138 A1 | 9/2007 | Yang |
| 2008/0258437 A1 | 10/2008 | Ryan |
| 2011/0175309 A1 | 7/2011 | Newhard |
| 2014/0183843 A1 | 7/2014 | Iftinca |
| 2018/0022371 A1 | 1/2018 | Jakubowski |
| 2021/0022314 A1 | 1/2021 | Xiang |

FOREIGN PATENT DOCUMENTS

| | | |
|---|---|---|
| CN | 102556133 A | 7/2012 |
| CN | 106949353 A | 7/2017 |
| EP | 3 159 239 A1 | 4/2017 |
| JP | 2005-162047 A | 6/2005 |
| JP | 2009-173075 A | 8/2009 |
| WO | 2011/087506 A1 | 7/2011 |

\* cited by examiner

STROLLER AND BASKET THEREOF

CROSS REFERENCE TO RELATED APPLICATIONS

This application is a continuation application of U.S. application Ser. No. 17/156,659, filed on Jan. 25, 2021, which is a continuation application of U.S. application Ser. No. 16/563,955, filed on Sep. 9, 2019, which claims the benefit of U.S. Provisional Application No. 62/729,115, filed on Sep. 10, 2018. The contents of these applications are incorporated herein by reference.

BACKGROUND OF THE INVENTION

1. Field of the Invention

The present invention relates to a stroller and a basket thereof, and more particularly, to a stroller and a basket thereof with expandable storage space.

2. Description of the Prior Art

Most strollers are used from birth to about three years old to transport babies and young children. Caring for an infant or toddler requires a lot of equipment and supplies, such as diapers, diaper bags, snacks, spare clothing, toys, etc. A conventional stroller usually has a fixed fabric basket located under a seat for storing the equipment and the supplies. However, most often there is not enough storage space. Sometimes a parent or a caregiver will resort to piling coats on a canopy or hanging a bag off back from a handle, which makes the stroller prone to tipping over.

SUMMARY OF THE INVENTION

Therefore, it is an objective of the present invention to provide a stroller and a basket thereof with expandable storage space for solving the aforementioned problem.

In order to achieve the aforementioned objective, the present invention discloses a stroller including a frame and a basket disposed on the frame. The basket includes a tube mount, a first tube member, a second tube member and a basket covering. The tube mount is disposed on the frame. The first tube member is connected to the tube mount. The second tube member is connected to the tube mount and rotatably switchable relative to the frame between a folded position and an unfolded position. The basket covering is disposed on the first tube member and the second tube member. A storage space is enclosed by the basket covering, and a volume of the storage space is adjustable by rotation of the second tube member relative to the frame.

In order to achieve the aforementioned objective, the present invention further discloses a basket adapted for a frame of a stroller. The basket includes a tube mount, a first tube member, a second tube member and a basket covering. The tube mount is disposed on the frame. The first tube member is connected to the tube mount. The second tube member is connected to the tube mount and rotatably switchable relative to the frame between a folded position and an unfolded position. The basket covering is disposed on the first tube member and the second tube member. A storage space is enclosed by the basket covering, and a volume of the storage space is adjustable by rotation of the second tube member relative to the frame.

In summary, in the present invention, when the second tube member is rotated from the folded position to the unfolded position, the volume of the storage space enclosed by the basket covering is increased. When the second tube member is rotated from the unfolded position to the folded position, the volume of the storage space enclosed by the basket covering is decreased. Therefore, it allows a user or a caregiver to easily adjust the volume of the storage space according to practical demands by rotating the second tube member relative to the frame, which brings convenience in use.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
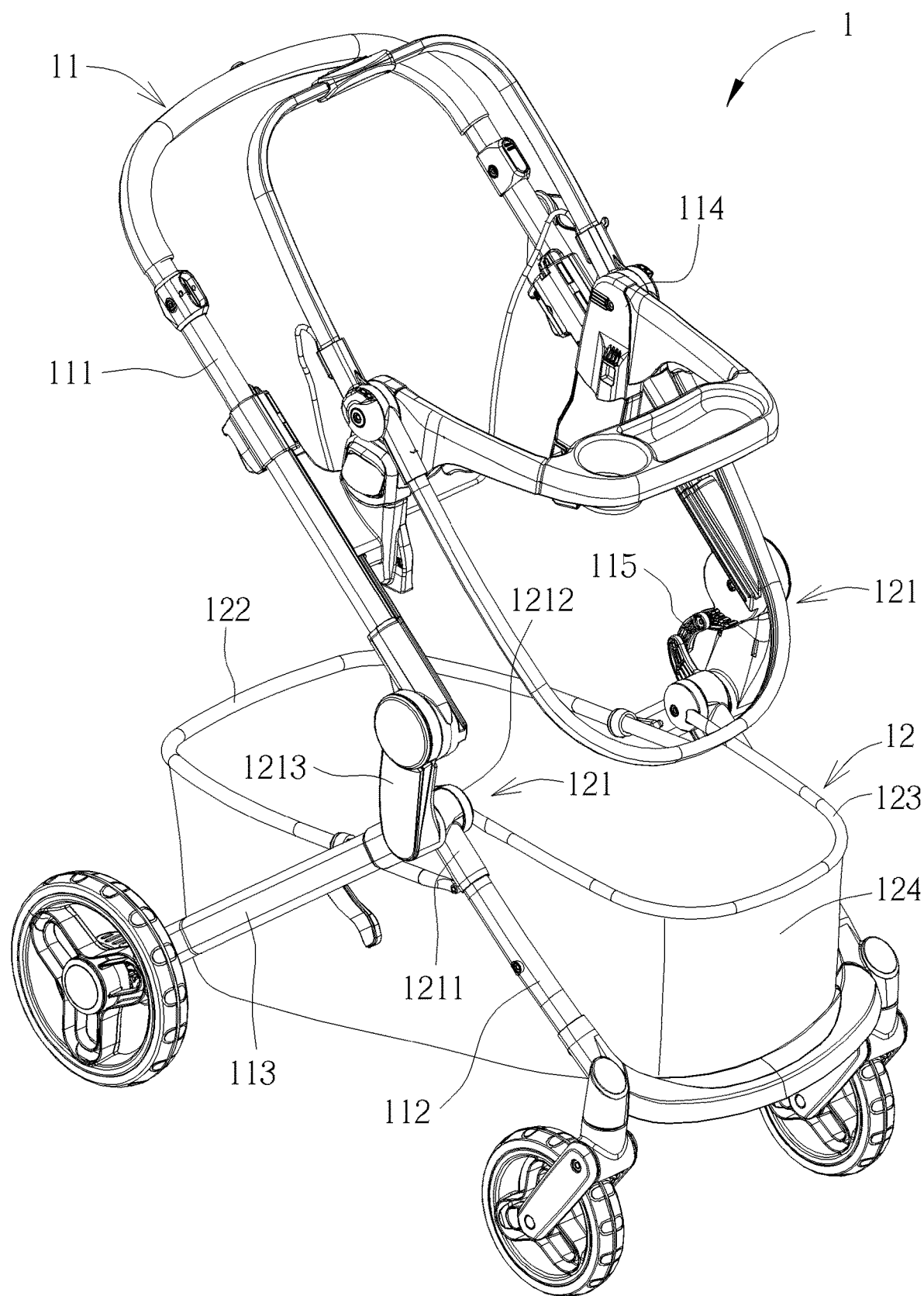
FIG. 1 is a schematic diagram of a stroller according to an embodiment of the present invention.
Figure 2:
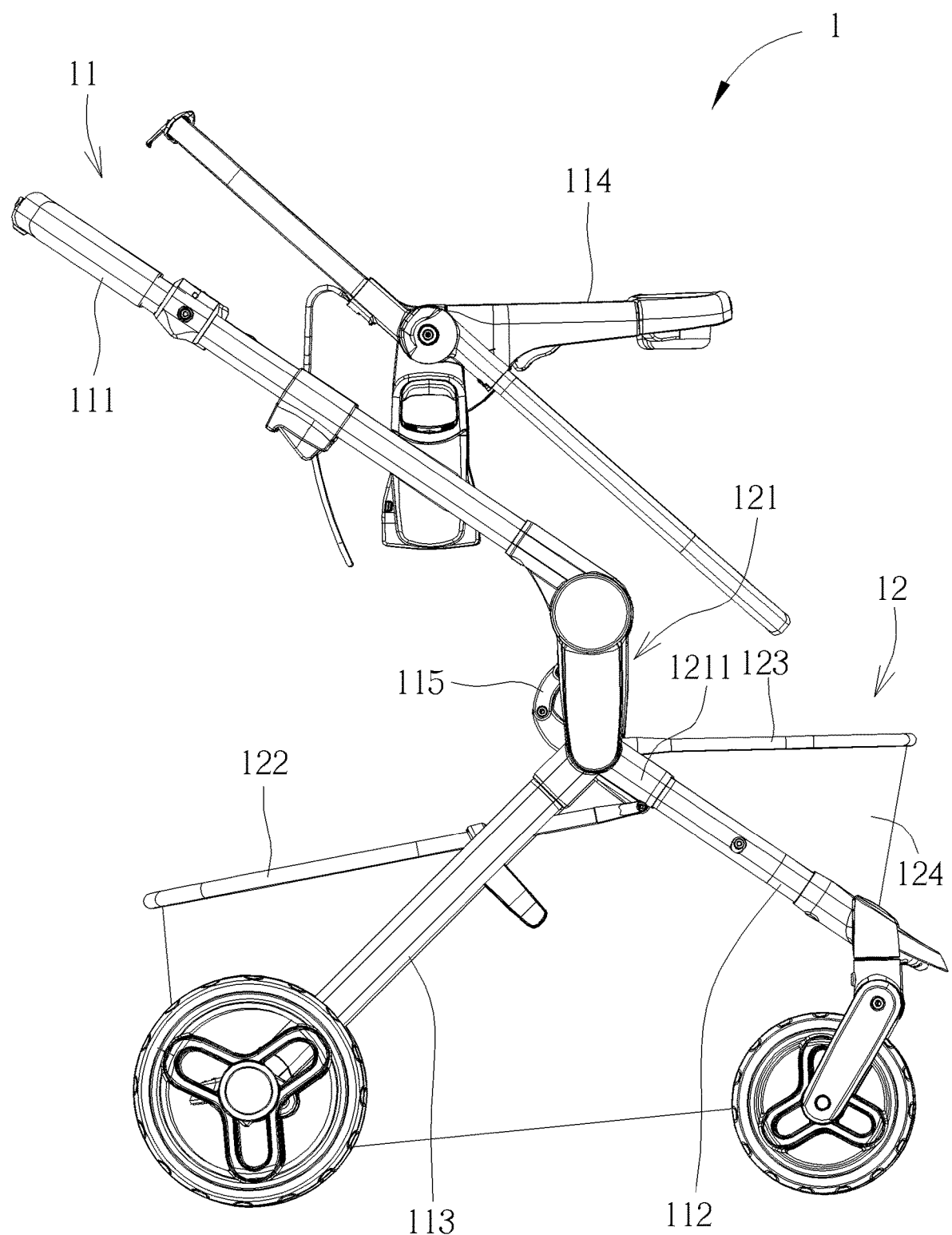
FIG. 2 and FIG. 3 are lateral view diagrams of the stroller in different states according to the embodiment of the present invention.
Figure 3:
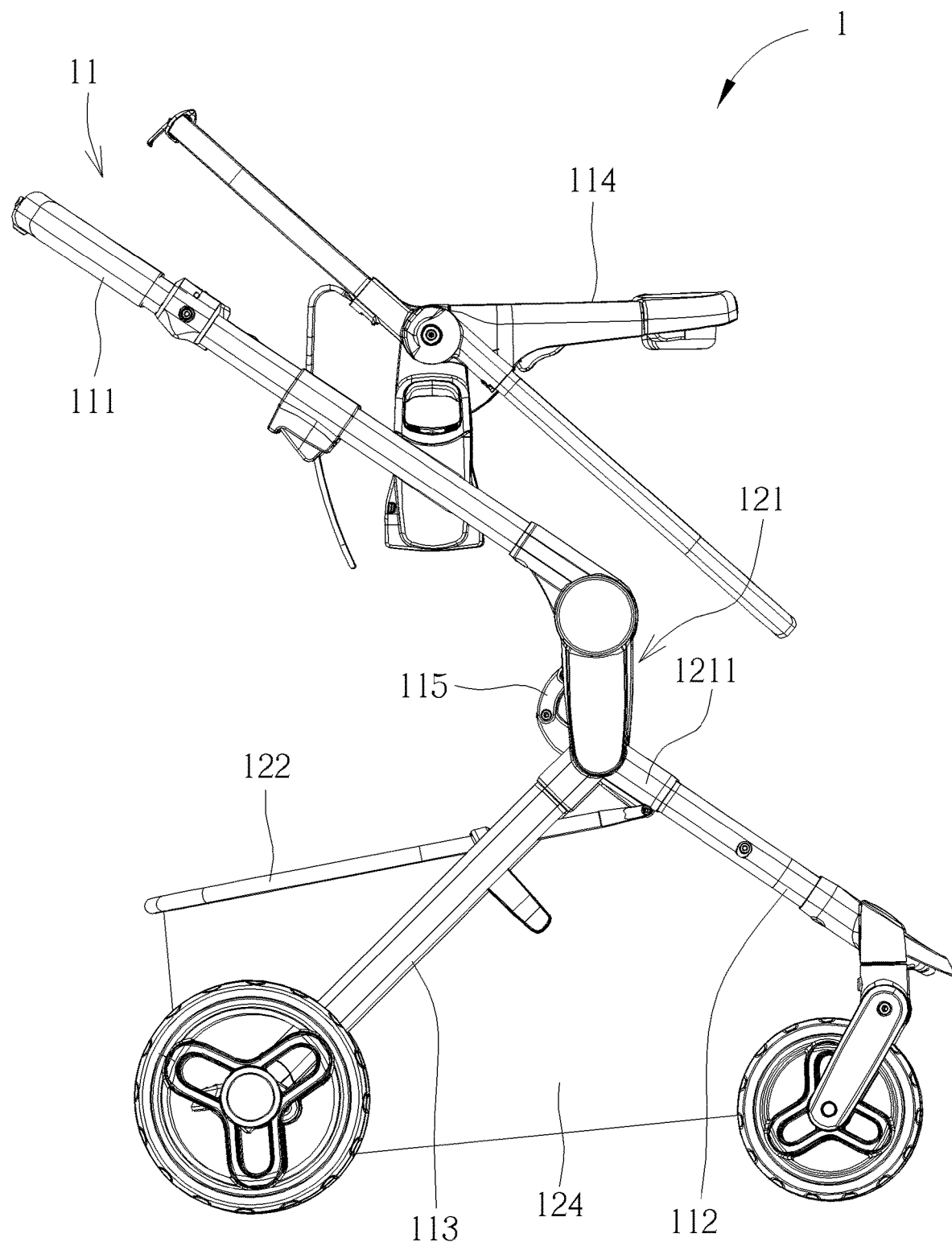
Figure 4:
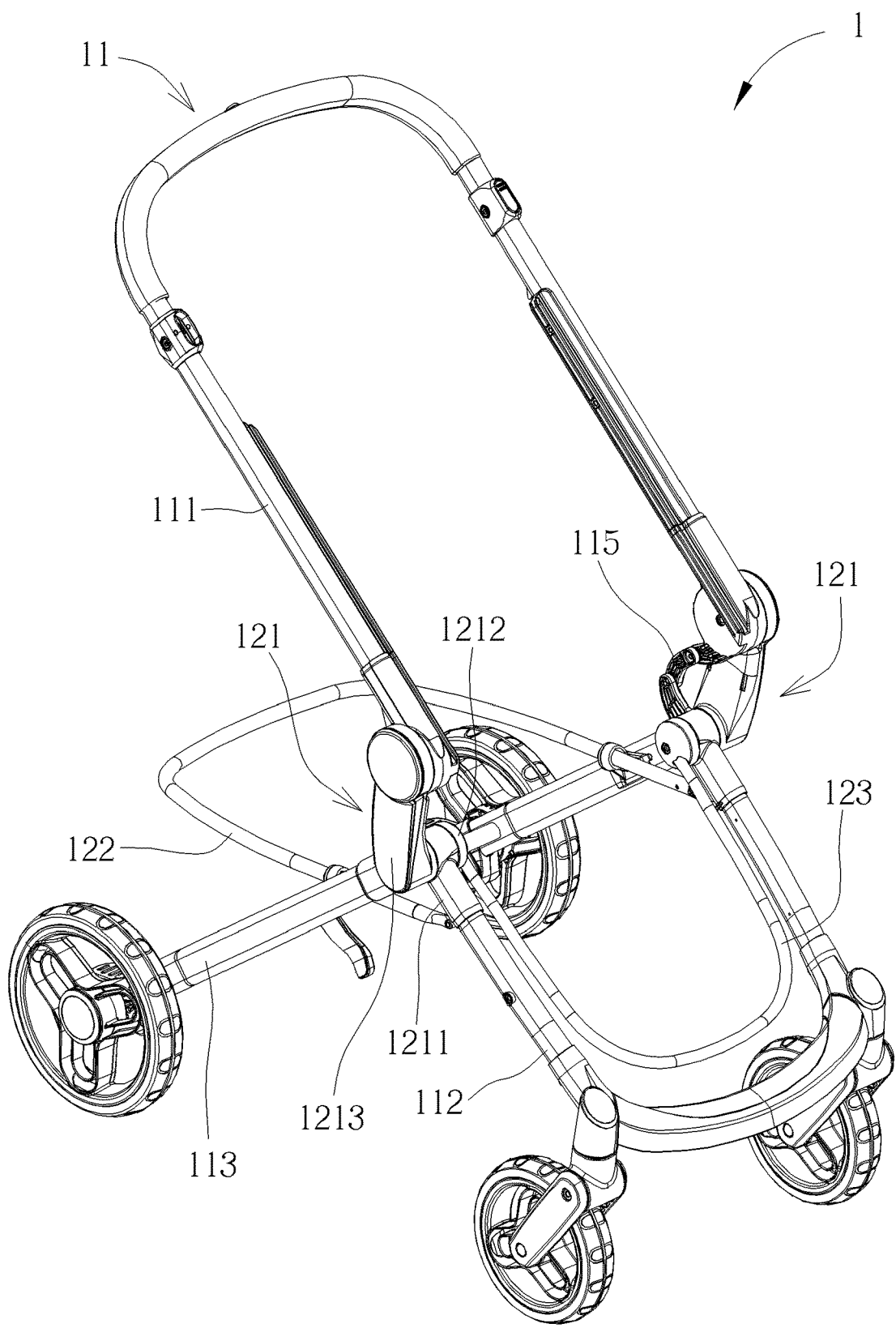
FIG. 4 and FIG. 5 are partial diagrams of the stroller at different views according to the embodiment of the present invention.
Figure 5:
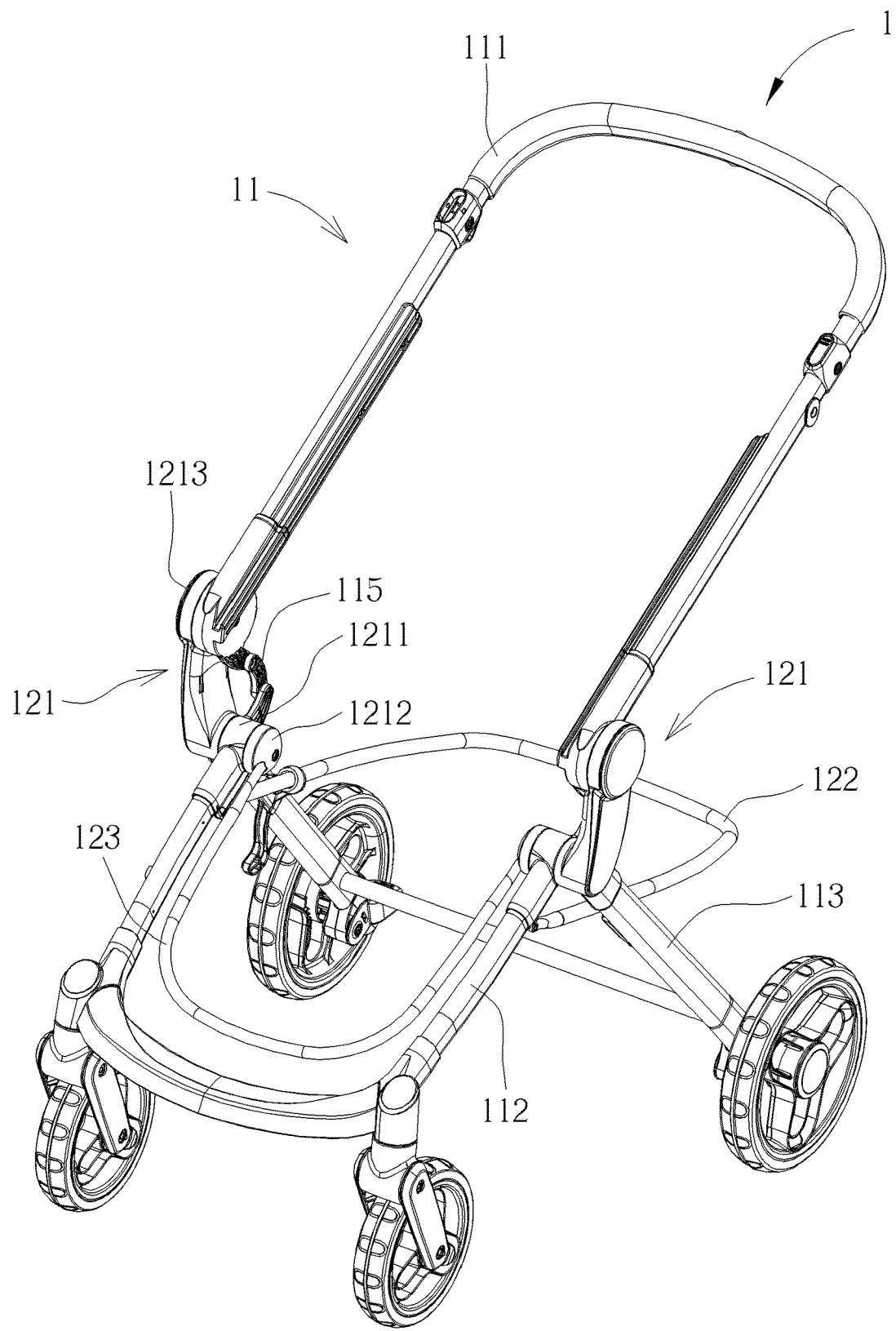

Please refer to FIG. 1 to FIG. 5. FIG. 1 is a schematic diagram of a stroller 1 according to an embodiment of the present invention. FIG. 2 and FIG. 3 are lateral view diagrams of the stroller 1 in different states according to the embodiment of the present invention. FIG. 4 and FIG. 5 are partial diagrams of the stroller 1 at different views according to the embodiment of the present invention. As shown in FIG. 1 to FIG. 5, the stroller 1 includes a frame 11 and a basket 12 disposed on the frame 11. The basket 12 includes two tube mounts 121, a first tube member 122, a second tube member 123 and a basket covering 124. The two tube mounts 121 are disposed on the frame 11 and located at two lateral sides of the frame 11. The first tube member 122 is connected to the two tube mounts 121. The second tube member 123 is rotatably connected to the two tube mounts 121 and switchable relative to the frame 11 between an unfolded position as shown in FIG. 2 and a folded position as shown in FIG. 3. The basket covering 124 is disposed on the first tube member 122 and the second tube member 123. A storage space is enclosed by the basket covering 124, and a volume of the storage space is adjustable by rotation of the second tube member 123 relative to the frame 11. When the second tube member 123 is rotated from the folded position as shown in FIG. 3 to the unfolded position as shown in FIG. 2, the basket covering 124 is gradually expanded, so that the volume of the storage space enclosed by the basket covering 124 is increased. When the second tube member 123 is rotated from the unfolded position as shown in FIG. 2 to the folded position as shown in FIG. 3, the basket covering 124 is gradually collapsed, so that the volume of the storage space enclosed by the basket covering 124 is decreased. However, the number of the tube mount is not limited to this embodiment. For example, in another embodiment, there can be only one tube mount located at one side of the frame.

Figure 6:
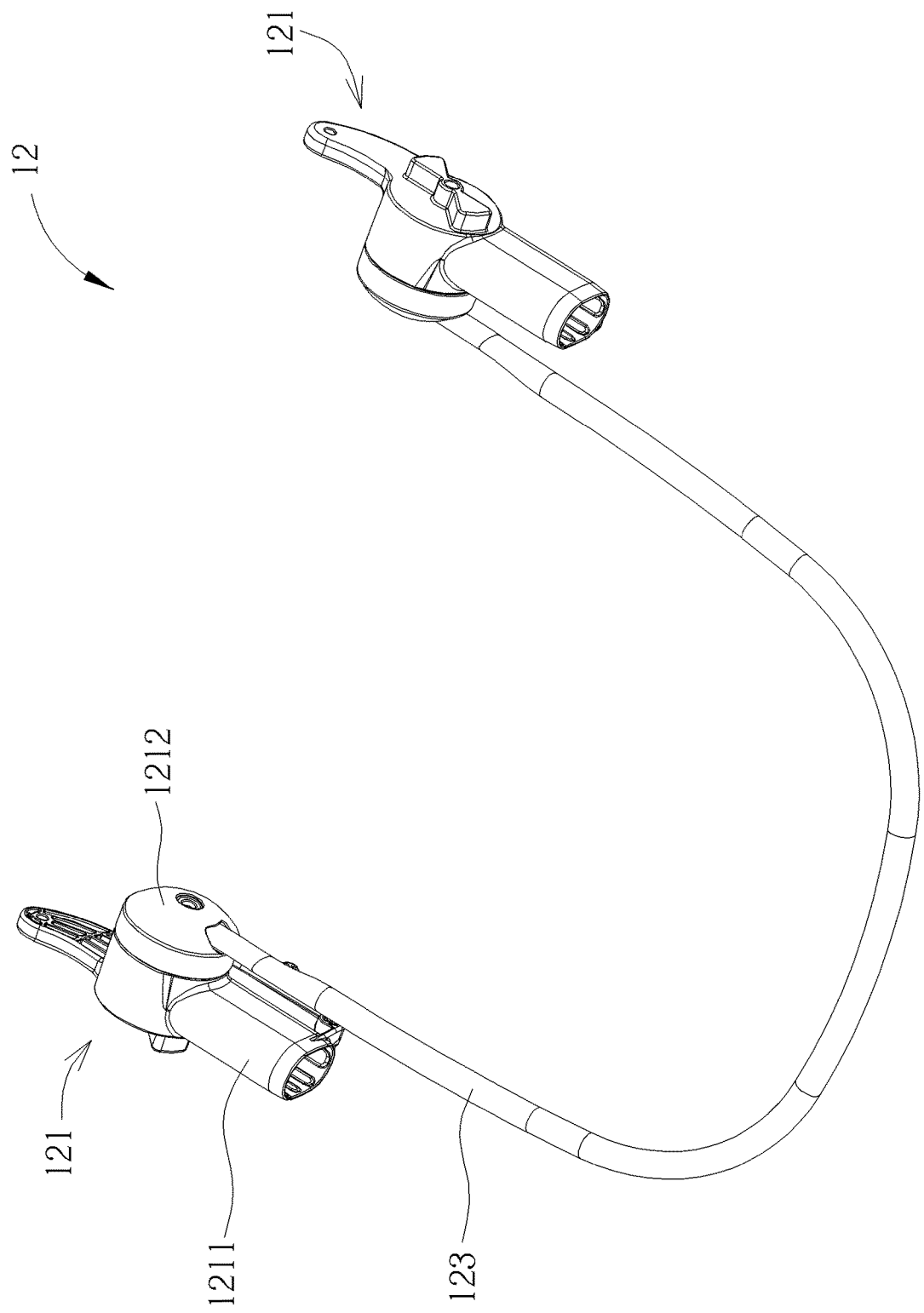
FIG. 6 is a partial diagram of a basket according to the embodiment of the present invention.
Figure 7:
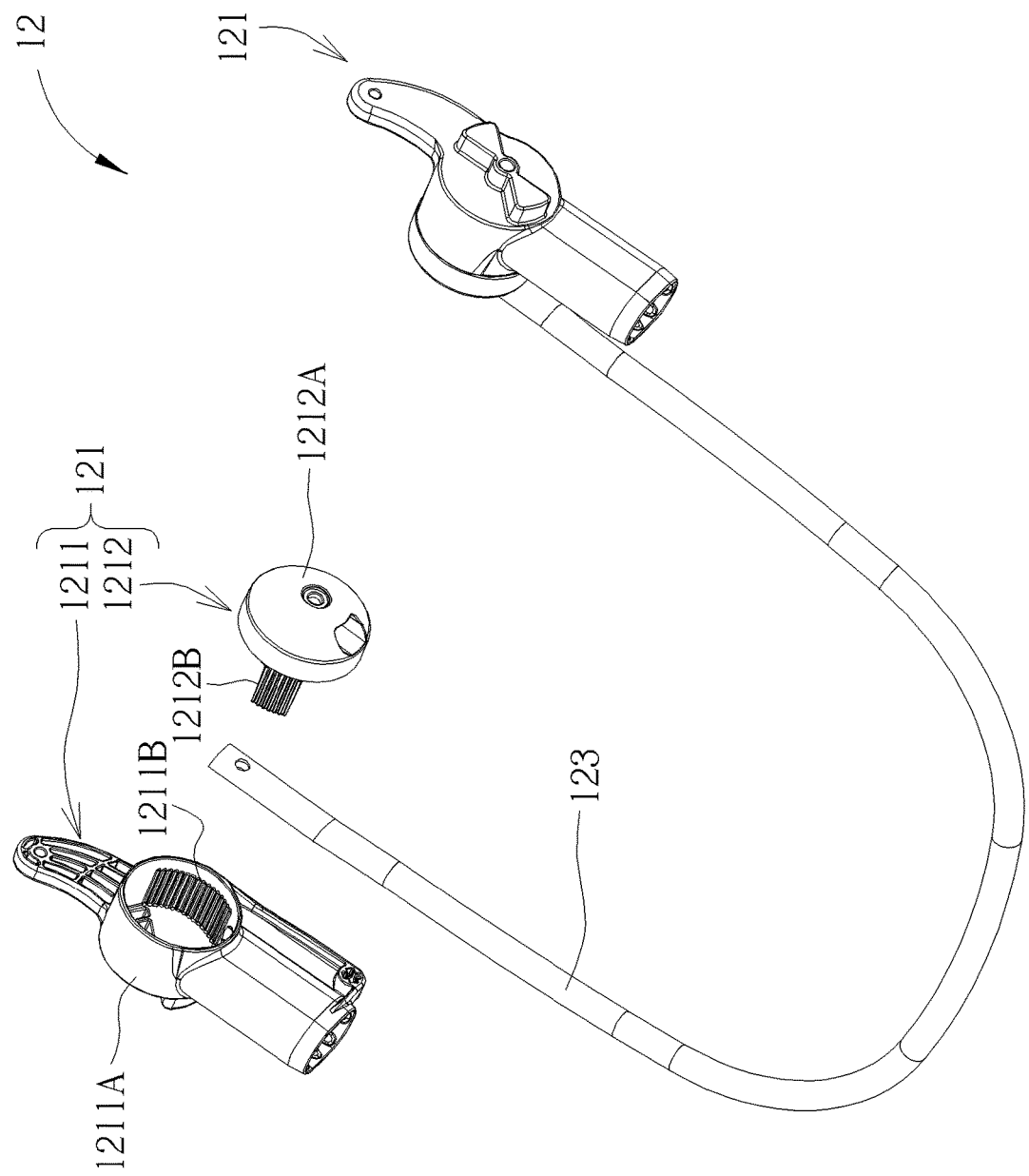
FIG. 7 is a partial exploded diagram of the basket according to the embodiment of the present invention.
Figure 8:
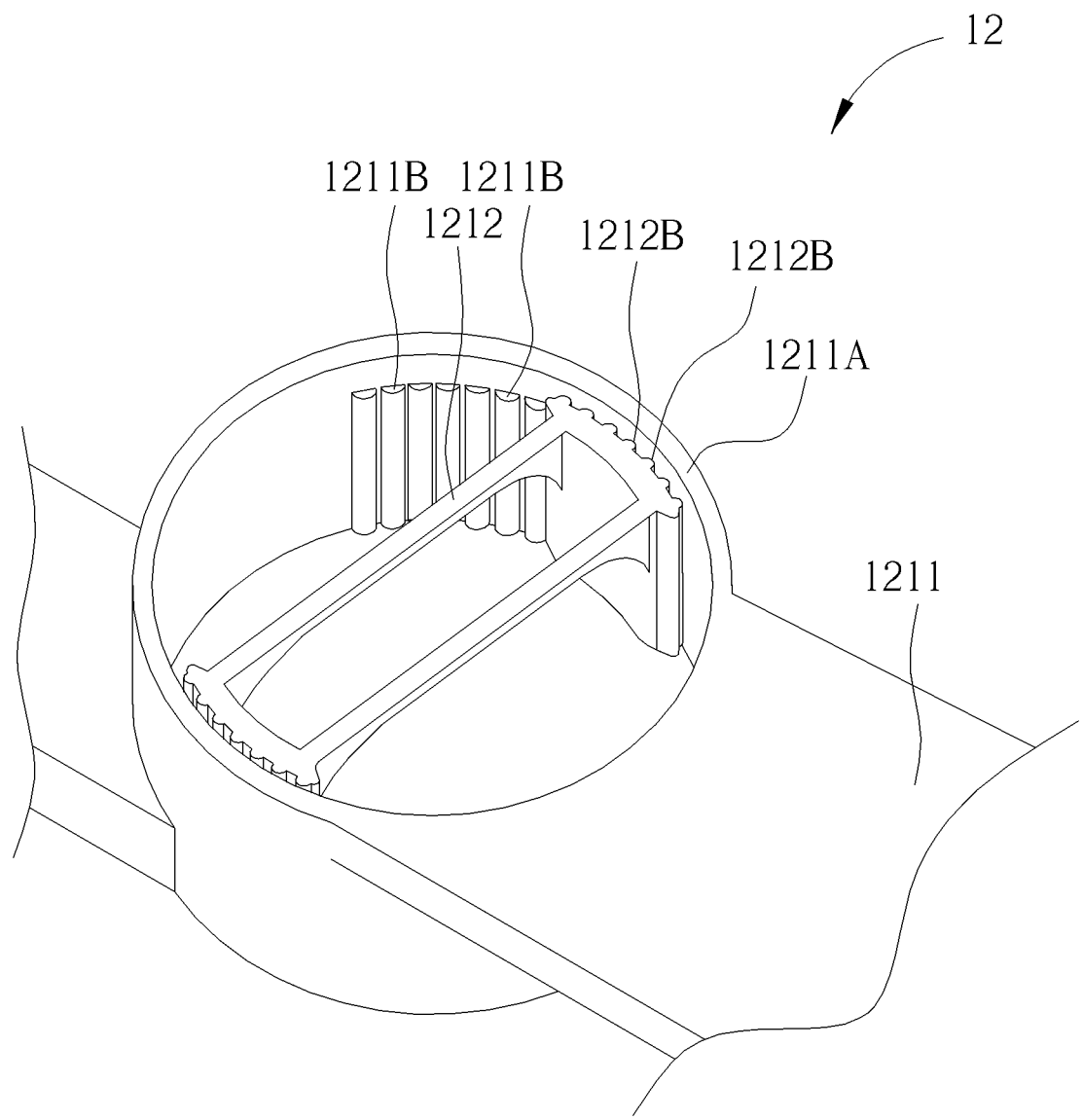
FIG. 8 is a partial internal structural diagram of the basket according to the embodiment of the present invention.
Figure 9:
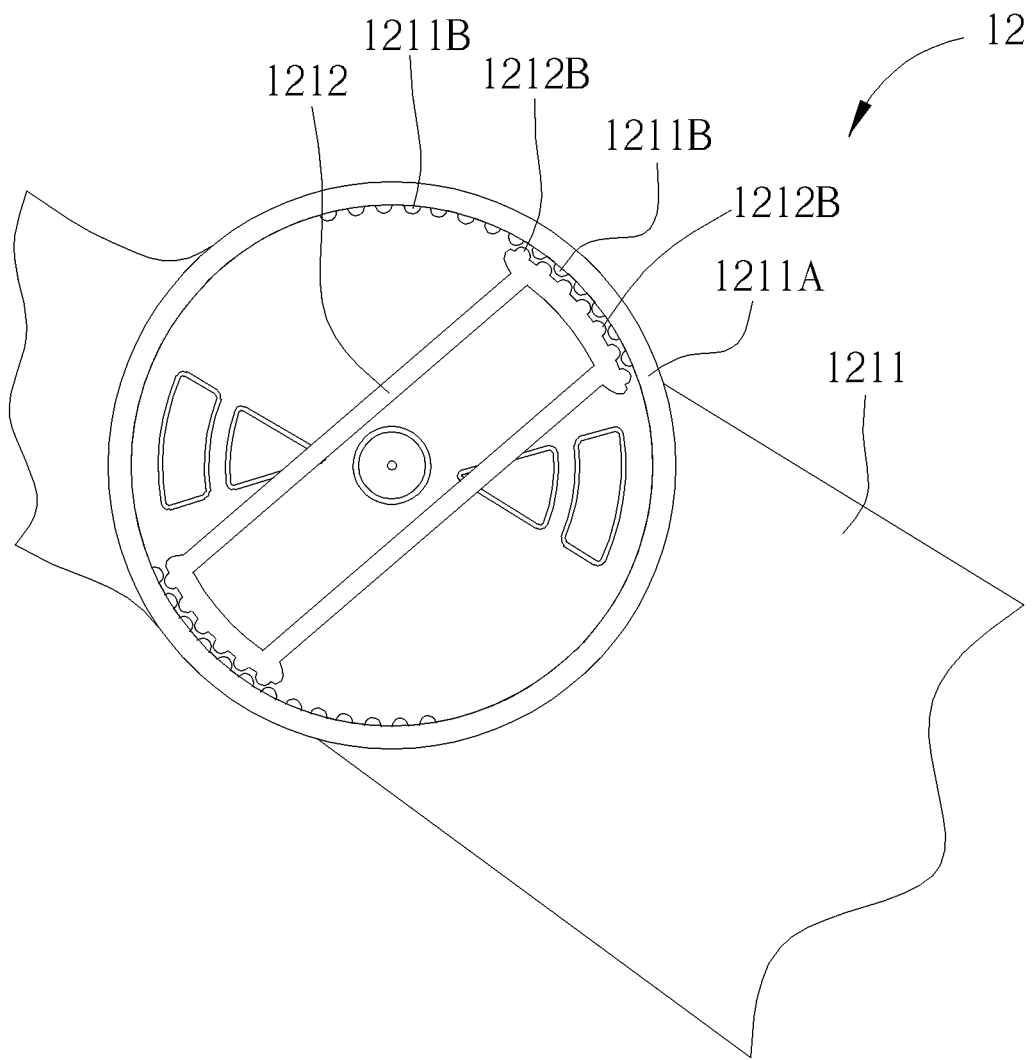
FIG. 9 and FIG. 10 are partial internal structural diagrams of the basket in different states according to the embodiment of the present invention.
Figure 10:
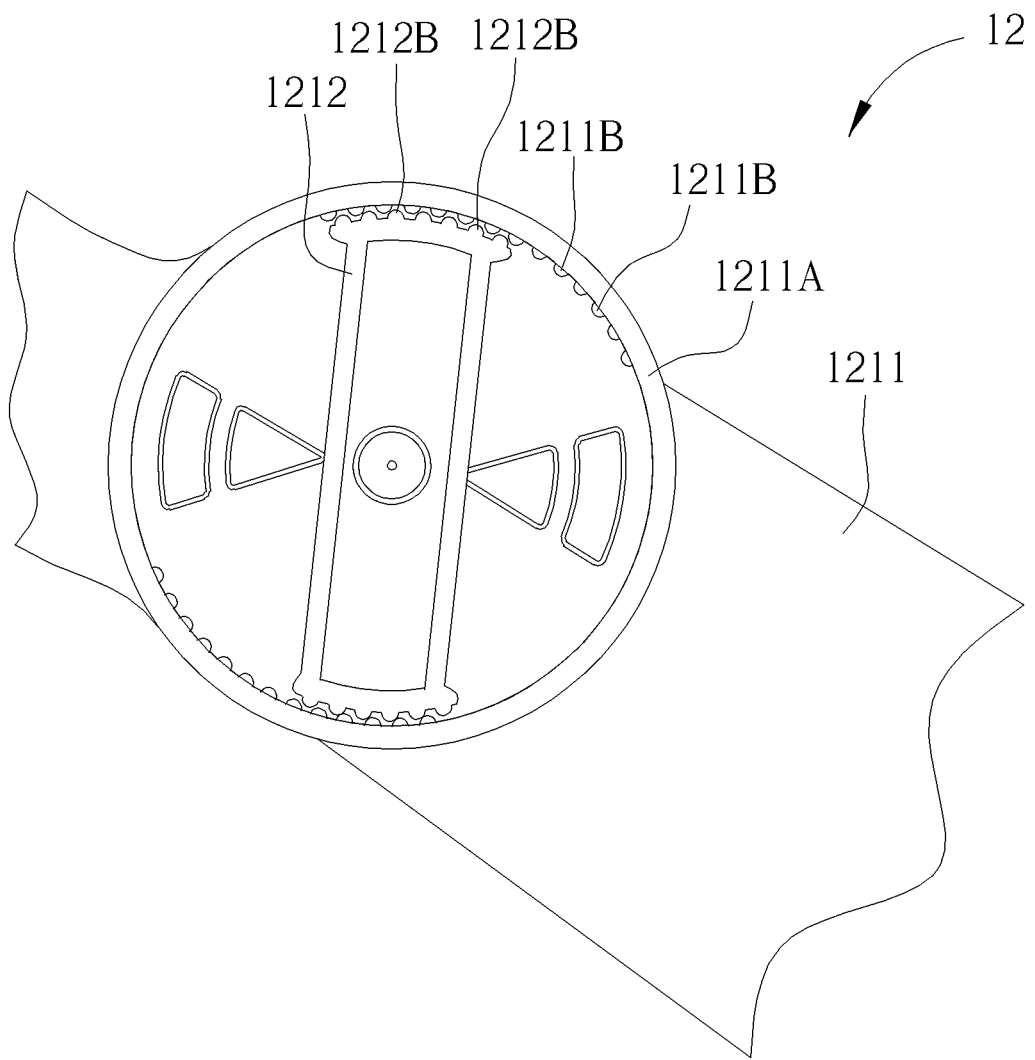

Please refer to FIG. 1 to FIG. 10. FIG. 6 is a partial diagram of the basket 12 according to the embodiment of the present invention. FIG. 7 is a partial exploded diagram of the basket 12 according to the embodiment of the present invention. FIG. 8 is a partial internal structural diagram of the basket 12 according to the embodiment of the present invention. FIG. 9 and FIG. 10 are partial internal structural diagrams of the basket 12 in different states according to the embodiment of the present invention. As shown in FIG. 1 to FIG. 10, the two tube mounts 121 located at the two lateral sides of the frame 11 can have the same structure. The tube mount 121 at one lateral side of the frame 11 is introduced as follows for simplicity. The tube mount 121 includes a first mount member 1211 and a second mount member 1212. The first mount member 1211 is disposed on the frame 11 and connected to the first tube member 122. The second mount member 1212 is disposed on the second tube member 123 and rotatably combined with the first mount member 1211. The second tube member 123 is rotatable relative to the frame 11 by rotation of the second mount member 1212 relative to the first mount member 1211.

Furthermore, the first mount member 1211 includes a housing 1211A. The second mount member 1212 includes a hub 1212A rotatably combined with the housing 1211A. A plurality of first ribs 1211B is formed on at least one portion of an inner wall of the housing 1211A. A plurality of second ribs 1212B is formed on at least one portion of an outer wall of the hub 1212A. The first mount member 1211 and the second mount member 1212 engage with each other by the plurality of first ribs 1211B and the plurality of second ribs 1212B for positioning the second tube member 123 at a desired position between the folded position and the unfolded position. In other words, the second tube member 123 can be positioned at any position between the unfolded position and the folded position by positioning the second mount member 1212 relative to the first mount member 1211 with engagement of the plurality of first ribs 1211B and the plurality of the second ribs 1212B, which achieves a purpose of multistage adjustment of the volume of the storage space.

Preferably, in this embodiment, the plurality of first ribs 1211B can be formed around at least one portion of the inner wall of the housing 1211A and made of plastic material, and the plurality of second ribs 1212B can be formed around at least one portion of the outer wall of the hub 1212A and made of plastic material. Furthermore, a cross section of each of the plurality of first rib 1211B and a cross section of each of the plurality of second rib 1212B can be formed in arc shapes. In such a way, the first ribs 1211B and the second ribs 1212B can be forced to be elastically deflected to disengage from each other for allowing the rotation of the second mount member 1212 relative to the first mount member 1211 when the second tube member 123 is operated by a user. Besides, the first ribs 1211B and the second ribs 1212B can be elastically recovered to engage with each other for positioning the second mount member 1212 relative to the first mount member 1211 when the second tube member 123 is released by the user. Therefore, no additional releasing mechanism for disengaging the first ribs from the second ribs is required, which simplifies operation and brings convenience in use.

Please further refer to FIG. 1 to FIG. 5. In order for easy storage and transportation of the stroller 1, the frame 11 is foldable and includes a handle 111, a front foot 112, a rear foot 113 and a seat 114 installed on the handle 111. The first mount member 1211 of the tube mount 121 is disposed on the front foot 112, and the tube mount 121 further includes a third mount member 1213 disposed on the rear foot 113 and rotatably combined with the first mount member 1211 and the handle 113. In other words, the front foot 112 is rotatably connected to the rear foot 113 by the two tube mounts 121, and the handle 111 is rotatably connected to the rear foot 113 by the two tube mounts 121.

In addition, in order to facilitate folding operation of the frame 11, the frame 11 further includes two link members 115. Each link member 115 is movably connected to the handle 111 and the first mount member 1211 of the corresponding tube mount 121. The handle 111 drives the front foot 112 to rotate toward the rear foot 113 by the two link members 115 when the handle 111 rotates relative to the third mount member 1213 to move toward the rear foot 113. However, the present invention is not limited to this embodiment. For example, in another embodiment, there can be no link member or only one link member located at one lateral side. Alternatively, there can be no third mount member, and the handle can be directly pivoted to the front foot or the rear foot accordingly.

In contrast to the prior art, the present invention utilizes the plurality of first ribs on the first mount member and the plurality of second ribs on the second mount member which are preferably made of the plastic material, to allow or restrain rotating movement of the second mount member relative to the first mount member. Therefore, the second tube member can be positioned at any position between the unfolded position and the folded position by positioning the second mount member relative to the first mount member with engagement of the plurality of first ribs and the plurality of the second ribs, which achieves a purpose of a multistage adjustment of the volume of the storage space. Furthermore, the plurality of first ribs and the plurality of second ribs can be forced to be elastically deflected to disengage from each other for allowing the rotating movement of the second mount member relative to the first mount member when the second tube member is operated to rotate relative to the frame.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A stroller comprising:
a frame, the frame comprising a handle and a link member movably connected to the handle; and
a basket disposed on the frame, the basket comprising:
a tube mount disposed on the frame;
a first tube member connected to the tube mount;

a second tube member connected to the tube mount and rotatably switchable relative to the frame between a folded position, an unfolded position, and a plurality of stages between the folded and unfolded positions; and a basket covering disposed on the first tube member and the second tube member, a storage space being enclosed by the basket covering, and a volume of the storage space being adjustable among the plurality of stages by rotation of the second tube member relative to the frame;

wherein the tube mount comprises a first mount member connected to the first tube member and movably connected to the link member, and the handle drives the first mount member via the link member, so as to drive the first tube member to rotate by the first mount member when the handle rotates.

2. The stroller of claim 1, wherein the tube mount further comprises a second mount member, the first mount member is disposed on the frame, the second mount member is disposed on the second tube member and rotatably combined with the first mount member, and the second tube member is rotatable relative to the frame by rotation of the second mount member relative to the first mount member.

3. The stroller of claim 2, wherein the first mount member comprises a housing, the second mount member comprises a hub rotatably combined with the housing, a plurality of first ribs is formed on at least one portion of an inner wall of the housing, a plurality of second ribs is formed on at least one portion of an outer wall of the hub, and the first mount member and the second mount member engage with each other by the plurality of first ribs and the plurality of second ribs.

4. The stroller of claim 3, wherein at least one of the plurality of first ribs and the plurality of second ribs is made of plastic material.

5. The stroller of claim 3, wherein a cross section of each of the plurality of first ribs and a cross section of each of the plurality of second ribs are formed in arc shapes.

6. The stroller of claim 1, wherein the frame further comprises a front foot and a rear foot, the front foot is rotatably connected to the rear foot by the tube mount, and the handle is rotatably connected to the rear foot by the tube mount.

7. The stroller of claim 6, wherein the tube mount further comprises a second mount member and a third mount member, the first mount member is disposed on the front foot, the second mount member is disposed on the second tube member and rotatably combined with the first mount member, and the third mount member is disposed on the rear foot and rotatably combined with the first mount member and the handle.

8. The stroller of claim 7, wherein the handle drives the front foot to rotate toward the rear foot by the link member when the handle rotates relative to the third mount member to move toward the rear foot.

9. A basket adapted for a frame of a stroller, the frame comprising a handle and a link member movably connected to the handle, the basket comprising:
a tube mount disposed on the frame;
a first tube member connected to the tube mount;
a second tube member connected to the tube mount and rotatably switchable relative to the frame between a folded position, an unfolded position, and a plurality of stages between the folded and unfolded positions; and
a basket covering disposed on the first tube member and the second tube member, a storage space being enclosed by the basket covering, and a volume of the storage space being adjustable among the plurality of stages by rotation of the second tube member relative to the frame;

wherein the tube mount comprises a first mount member connected to the first tube member and movably connected to the link member, and the handle drives the first mount member via the link member, so as to drive the first tube member to rotate by the first mount member when the handle rotates.

10. The basket of claim 9, wherein the tube mount further comprises a second mount member, the first mount member is disposed on the frame, the second mount member is disposed on the second tube member and rotatably combined with the first mount member, and the second tube member is rotatable relative to the frame by rotation of the second mount member relative to the first mount member.

11. The basket of claim 10, wherein the first mount member comprises a housing, the second mount member comprises a hub rotatably combined with the housing, a plurality of first ribs is formed on at least one portion of an inner wall of the housing, a plurality of second ribs is formed on at least one portion of an outer wall of the hub, and the first mount member and the second mount member engage with each other by the plurality of first ribs and the plurality of second ribs.

12. The basket of claim 11, wherein at least one of the plurality of first ribs and the plurality of second ribs is made of plastic material.

13. The basket of claim 11, wherein a cross section of each of the plurality of first ribs and a cross section of each of the plurality of second ribs are formed in arc shapes.

14. The basket of claim 9, wherein the tube mount further comprises a second mount member and a third mount member, the first mount member is disposed on a front foot of the frame, the second mount member is disposed on the second tube member and rotatably combined with the first mount member, and the third mount member is disposed on a rear foot of the frame and rotatably combined with the first mount member and the handle of the frame.

15. A stroller comprising:
a frame comprising a handle, a front foot, a rear foot, and a link member; and
a basket disposed on the frame, the basket comprising:
a tube mount disposed on the frame,
a first tube member connected to the tube mount,
a first mount member disposed on the front foot and connected to the first tube member,
a second tube member connected to the tube mount and rotatably switchable relative to the frame between a folded position and an unfolded position,
a second mount member disposed on the second tube member and rotatably combined with the first mount member, and
a basket covering disposed on the first tube member and the second tube member, a storage space being enclosed by the basket covering,
wherein the front foot is rotatably connected to the rear foot by the tube mount, and wherein the handle is rotatably connected to the rear foot by the tube mount, and
wherein the link member is movably connected to the handle and the first mount member, and the handle drives the front foot to rotate toward the rear foot by the link member when the handle rotates.

16. The stroller of claim 15, wherein the tube mount further comprises a third mount member disposed on the rear foot and rotatably combined with the first mount member and the handle.

17. The stroller of claim 16, wherein the handle drives the front foot to rotate toward the rear foot by the link member when the handle rotates relative to the third mount member to move toward the rear foot.

18. The stroller of claim 15, wherein the volume of the storage space of the basket is adjustable by rotation of the second tube member relative to the frame.

* * * * *